(12) United States Patent
Blangé

(10) Patent No.: US 7,322,433 B2
(45) Date of Patent: Jan. 29, 2008

(54) TOOL FOR EXCAVATING AN OBJECT

(75) Inventor: Jan-Jette Blangé, Rijswijk (NL)

(73) Assignee: Shell Oil Company, Houston, TX (US)

( * ) Notice: Subject to any disclaimer, the term of this patent is extended or adjusted under 35 U.S.C. 154(b) by 101 days.

(21) Appl. No.: 10/564,008

(22) PCT Filed: Jul. 9, 2004

(86) PCT No.: PCT/EP2004/051428

§ 371 (c)(1),
(2), (4) Date: Jan. 9, 2006

(87) PCT Pub. No.: WO2005/005768

PCT Pub. Date: Jan. 20, 2005

(65) Prior Publication Data

US 2006/0219443 A1    Oct. 5, 2006

(30) Foreign Application Priority Data

Jul. 9, 2003 (EP) .................................. 03077159
Apr. 14, 2004 (EP) .................................. 04101506

(51) Int. Cl.
*E21B 7/18* (2006.01)
(52) U.S. Cl. ........................ 175/424; 166/222
(58) Field of Classification Search ................ None
See application file for complete search history.

(56) References Cited

U.S. PATENT DOCUMENTS

| | | | |
|---|---|---|---|
| 2,779,571 A | 1/1957 | Ortloff | |
| 3,375,886 A | 4/1968 | Goodwin et al. | 175/66 |
| 3,416,614 A | 12/1968 | Goodwin et al. | |
| 3,489,280 A | 1/1970 | Israelson et al. | 209/223 |
| 3,831,753 A | 8/1974 | Gaylord et al. | 209/399 |
| 3,938,600 A | 2/1976 | Essmeier | 175/422 |

(Continued)

FOREIGN PATENT DOCUMENTS

CN     1367294     9/2002

(Continued)

OTHER PUBLICATIONS

Robert D. Blevins, Applied Fluid Dynamics Handbook, Krieger Publishing Company, p. 260. (1984).

*Primary Examiner*—Frank Tsay

(57) ABSTRACT

A Tool for excavating an object, the tool having
a jetting system arranged to impinge the object to be excavated with a jetted stream of a drilling fluid mixed with abrasive particles, the jetting system being provided with at least a mixing chamber with a drilling fluid inlet, a second inlet for abrasive particles, and an outlet nozzle for releasing the drilling fluid mixed with the abrasive particles;
a recirculation system arranged to recirculate at least some of the abrasive particles, from a return stream of the fluid mixed with the abrasive particles downstream impingement of the jet with the object back to the jetting system, whereby the abrasive particles have a magnetic material, which recirculation system has a separator magnet for separating the abrasive particles from the return stream and for transporting the particles to the second inlet; and,
a piece of magnetic material that is provided in or in the vicinity of the mixing chamber such as to draw a part of the magnetic field generated by the separator magnet into the mixing chamber.

18 Claims, 5 Drawing Sheets

U.S. PATENT DOCUMENTS

| | | | |
|---|---|---|---|
| 3,949,354 A | 4/1976 | Claycomb | 340/18 |
| 3,952,857 A | 4/1976 | Nazuka | 198/41 |
| 4,119,160 A | 10/1978 | Summers et al. | 175/67 |
| 4,396,071 A | 8/1983 | Stephens | 175/50 |
| 4,555,972 A | 12/1985 | Yie | 51/439 |
| 4,637,479 A | 1/1987 | Leising | 175/26 |
| 4,787,465 A | 11/1988 | Dickinson, III et al. | 175/67 |
| 4,993,503 A | 2/1991 | Fischer et al. | 175/62 |
| 5,170,891 A | 12/1992 | Barrett | 209/223.2 |
| 5,291,956 A | 3/1994 | Mueller et al. | 175/67 |
| 5,314,030 A | 5/1994 | Peterson et al. | 175/61 |
| 5,887,667 A | 3/1999 | Van Zante et al. | 175/67 |
| 5,944,123 A | 8/1999 | Johnson | 175/73 |
| 6,062,311 A | 5/2000 | Johnson et al. | 166/312 |
| 6,109,370 A | 8/2000 | Gray | 175/61 |
| 6,283,833 B1 | 9/2001 | Pao et al. | 451/40 |
| 6,412,643 B1 | 7/2002 | Wysolmierski | 209/213 |
| 6,510,907 B1 | 1/2003 | Blange | 175/67 |
| 6,702,940 B2 | 3/2004 | Blange | 210/222 |
| 7,017,684 B2 | 3/2006 | Blange | 175/424 |
| 2002/0079998 A1 | 6/2002 | Blange | 335/302 |
| 2006/0185907 A1 | 8/2006 | Blange | 175/424 |

FOREIGN PATENT DOCUMENTS

| | | |
|---|---|---|
| DE | 2052516 | 4/1972 |
| DE | 2832037 | 1/1980 |
| EP | 069530 | 1/1983 |
| EP | 0119338 | 9/1984 |
| EP | 526087 | 2/1993 |
| GB | 892905 | 4/1962 |
| GB | 2284837 | 6/1995 |
| SU | 924334 | 4/1982 |
| WO | WO9112930 | 5/1991 |
| WO | WO0066872 | 11/2000 |
| WO | 02/34653 | 5/2002 |
| WO | 02/092956 | 11/2002 |
| WO | 2005/005765 | 1/2005 |
| WO | 2005/005766 | 1/2005 |
| WO | 2005/005767 | 1/2005 |
| WO | WO2005005768 | 1/2005 |
| WO | 2005/038189 | 4/2005 |
| WO | 2005/040546 | 5/2005 |
| WO | WO2005040546 | 6/2005 |
| WO | WO2005051426 | 6/2005 |

TOOL FOR EXCAVATING AN OBJECT

PRIORITY CLAIM

The present application claims priority of European Patent Application No. 03077159.6 filed 09 Jul. 2003 and European Patent Application No.04101506.6 filed 14 Apr. 2004.

FIELD OF THE INVENTION

The present invention relates to a tool for excavating an object.

In particular, the tool of the present invention comprises:

a jetting system arranged to impinge the object to be excavated with a jetted stream of a drilling fluid mixed with abrasive particles, the jetting system being provided with at least a mixing chamber with a drilling fluid inlet, a second inlet for abrasive particles, and an outlet nozzle for releasing the drilling fluid mixed with the abrasive particles;

a recirculation system arranged to recirculate at least some of the abrasive particles.

BACKGROUND OF THE INVENTION

Such a tool can typically be provided on a lower end of a drill string that is deployed in a subterranean bore hole, whereby during operation the drilling fluid is pumped from surface through a longitudinal channel in the drill string to the tool and essentially back to surface in a return stream through an annular space between the drill string and the bore hole wall.

In order to avoid continuous circulation of the abrasive particles through the drill string and the annular space, U.S. Pat. No. 6,510,907 proposes to provide the tool with a recirculation system for separating the abrasive particles from the return stream and re-inserting these particles into a mixing chamber through which the main stream of drilling fluid is passed. Embodiments of the recirculation system are based on a separator magnet for magnetically separating the abrasive particles from the return stream, which abrasive particles are made of a magnetic material for that purpose.

Another such tool is described in International publication WO 02/34653. The recirculation system of that tool is based on a helical separator magnet that is concentrically arranged within a support member. The support member is formed by a cylindrical sleeve, of which sleeve the outer surface forms a support surface on which magnetic particles are retained by the magnetic field generated by the helical separator magnet. The separator magnet has a central longitudinal axis about which the separator magnet is rotatable relative to the sleeve.

When the separator magnet is driven into axial rotation, the magnetic particles experience a moving gradient of magnetic field strength perpendicular to the helical groove, which the particles will follow. In this way the particles are transported over the support surface back to the jetting system for re-insertion into the mixing chamber.

Both prior art tools rely on an efficient transfer of the magnetic abrasive particles from the separator magnet into the mixing chamber for entrainment with the stream of drilling fluid.

In particular when a large number of abrasive particles must be recirculated per time unit, the transfer must be efficient or else the abrasive particle inlet into the mixing chamber can be blocked by an excess of magnetic particles arriving at the inlet.

SUMMARY OF THE INVENTION

In order to improve the transfer, the invention provides a tool for excavating an object, the tool comprising:

a jetting system arranged to impinge the object to be excavated with a jetted stream of a drilling fluid mixed with abrasive particles, the jetting system being provided with at least a mixing chamber with a drilling fluid inlet, a second inlet for abrasive particles, and an outlet nozzle for releasing the drilling fluid mixed with the abrasive particles;

a recirculation system arranged to recirculate at least some of the abrasive particles, from a return stream of the fluid mixed with the abrasive particles downstream impingement of the jet with the object back to the jetting system, whereby the abrasive particles comprise a magnetic material, which recirculation system comprises a separator magnet for separating the abrasive particles from said return stream and for transporting the particles to the second inlet;

a piece of magnetic material that is provided in or in the vicinity of the mixing chamber such as to draw a part of the magnetic field generated by the separator magnet into the mixing chamber.

Under influence of the separator magnet in the recirculation system, the piece of magnetic material will magnetize and an image pole will be formed in the piece of magnetic material having opposite polarity from the pole on the separator magnet being exposed to the piece of magnetic material. Magnetic field lines will cross over from the pole on the separator magnet to the induced image pole in the piece of magnetic material, and thereby part of the magnetic field generated by the separator magnet is drawn into the mixing chamber. The magnetic field gradient that the magnetic abrasive particles experience is therefore lower locally in the vicinity of the inlet for abrasive particles than it is elsewhere in the vicinity of the separator magnet. For this reason, the transfer efficiency of the abrasive particles from the recirculation system into the mixing chamber is improved.

Preferably, a part of the magnetic field in the mixing chamber is directed essentially transverse to a drilling fluid flow path between the drilling fluid inlet and the outlet nozzle. Herewith it is achieved that the magnetic particles are drawn into the mixing chamber in the form of chains that run transverse to the flow direction of the drilling fluid in the mixing chamber. Herewith the interaction between the drilling fluid and the abrasive particles is maximised so that the abrasive particles can pick up kinetic energy with maximum efficiency.

In an embodiment wherein the recirculation system comprises a support surface to guide the abrasive particles towards the second inlet, a shield can be provided at a distance from the support surface leaving a gap between the shield and the support surface thereby forming a path from the return stream to the second inlet along the support surface.

Herewith fluid can be guided from the return stream into the second inlet, thereby further supporting the passage of the abrasive particles through the second inlet into the mixing chamber.

BRIEF DESCRIPTION OF THE DRAWINGS

The invention will now be illustrated by way of example, with reference to the accompanying drawing wherein FIG. 1 schematically shows a cross section of part of a tool for excavating an object.

DETAILED DESCRIPTION OF THE INVENTION

Figure 1:
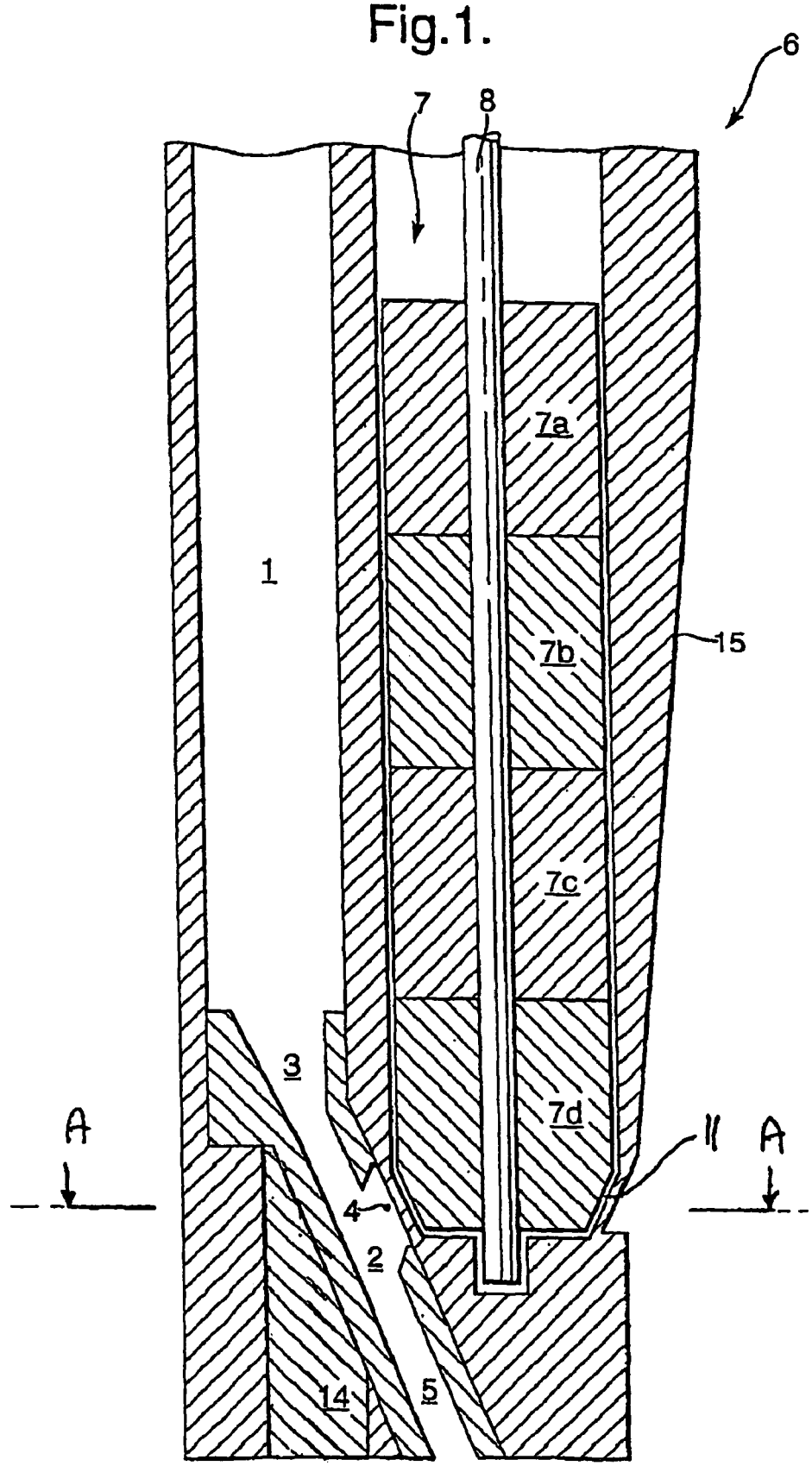

In the figures, like parts carry identical reference numerals. Where, in the following description, a direction of rotation is specified, the direction of transport is each time the viewing direction in relation to which the rotary direction is defined.

Part of a tool for excavating an object is schematically shown in longitudinal section in FIG. 1. The tool can be connected to the lower end of a drill string (not shown) extending into a borehole formed in an object such as an earth formation. The tool is arranged to jet a stream of drilling fluid mixed with abrasive particles against the object to be excavated and to recirculate at least part of the abrasive particles. The abrasive particles must be magnetisable for this tool.

The tool is provided with a longitudinal drilling fluid passage 1, which is at one end thereof in fluid communication with a drilling fluid channel provided in the drill string and at the other end thereof in fluid communication with a jetting system that comprises a mixing chamber 2 that is connected to the drilling fluid passage 1 via a drilling fluid inlet 3.

The mixing chamber 2 is also in fluid communication with a second inlet 4 for abrasive particles (an abrasive particle inlet) and with a mixing nozzle 5 having an outlet (not shown) arranged to jet a stream of drilling fluid and abrasive particles against the earth formation during drilling with the drilling tool in the borehole.

The mixing chamber is provided with a piece of magnetic material 14 on the side opposite from the abrasive particle inlet 4.

The mixing nozzle 5 is arranged inclined relative to the longitudinal direction of the drilling tool at an inclination angle of 15-30° relative to vertical, but other angles can be used. Preferably the inclination angle is about 21°, which is optimal for abrasively eroding the bottom of the bore hole by axially rotating the complete tool inside the bore hole. The mixing chamber 2 and mixing nozzle 5 are aligned with an outlet nozzle under the same angle, in order to achieve optimal acceleration of the abrasive particles.

The drilling fluid passage 1 is arranged to bypass a device 6 for transporting magnetic particles that is included in the tool as part of a recirculation system for the magnetic abrasive particles which can be used if the abrasive particles contain a magnetic material. The device 6 includes a support member in the form of a slightly tapered sleeve 15 for providing a support surface extending around an essentially cylindrically shaped elongate separator magnet 7. The separator magnet 7 generates a magnetic field for retaining the magnetic particles on the support surface 15.

The drilling fluid passage 1 is fixedly arranged relative to the support surface 15 and the mixing chamber 2. The drilling fluid passage 1 has a lower end arranged near the second inlet 4 for abrasive particles. In the present embodiment the drilling fluid passage 1 is formed inside a ridge in the axial direction which ridge is in protruding contact with the support surface 15. The drilling fluid passage 1 may alternatively be arranged freestanding from the support surface in a manner similar to that shown and described in International Publication WO 02/34653 with reference to FIG. 4 therein, or in an off-axial direction. The second inlet 4 for abrasive particles is located at the lower end of the ridge.

The support surface 15 has a conical shape. Alternatively, the support surface may be cylindrical.

The cylindrical separator magnet 7 is formed of four smaller magnets 7a, 7b, 7c, and 7d stacked together. A different number of the smaller magnets can also be used. Each separator magnet 7a, 7b, 7c, and 7d has diametrically opposed N and S poles, and the magnets are stacked in a manner that adjacent magnets have N-S directions azimuthally rotated with respect to each other about the central longitudinal axis 8 over an angle φ such that two essentially helical diametrically opposing bands are each formed by alternating N and S poles.

For the purpose of this specification, a magnetic pole is an area on the magnet surface or on the support surface where magnetic field lines cross the magnet surface or the support surface thereby appearing as an area of source or sink for magnetic field lines.

Due to the nature of a bipolar magnet, the magnetic field strength in the regions between the N and S poles in each of the smaller magnets 7a, 7b, 7c, and 7d is lower than in the essentially helically aligned regions around the N and S poles. In this way, the helical bands of alternating N and S poles form a high-field band of increased magnetic field strength relative to regions forming low-field band displaced by about 90° in azimuth with respect to that high-field band. In between the high- and low-field bands, there is a gradient zone where the magnetic field strength decreases from the increased value in the high-field band to the value in the low-field band.

The separator magnet 7 has a central longitudinal axis 8 and is rotatable relative to the sleeve 15 and about the central longitudinal axis 8. Drive means are provided (not shown) to drive axis 8 and thereby rotate the separator magnet 7 into either clockwise or counter clockwise rotation as dictated by the sense of the helical band. The drive means may advantageously be provided in the form of an electric motor, which motor may be controlled by a control system (not shown).

A short tapered section 11 is provided at the lower end of magnet 7d. The sleeve 15 is provided with a corresponding conical taper in a manner that the second inlet 4 for abrasive particles provides fluid communication between the support surface 15 surrounding the tapered section 11 and the mixing chamber 2. The conical taper is best based on the same angle as the above-discussed angle of the mixing chamber 2 and mixing nozzle 5.

Figure 2:
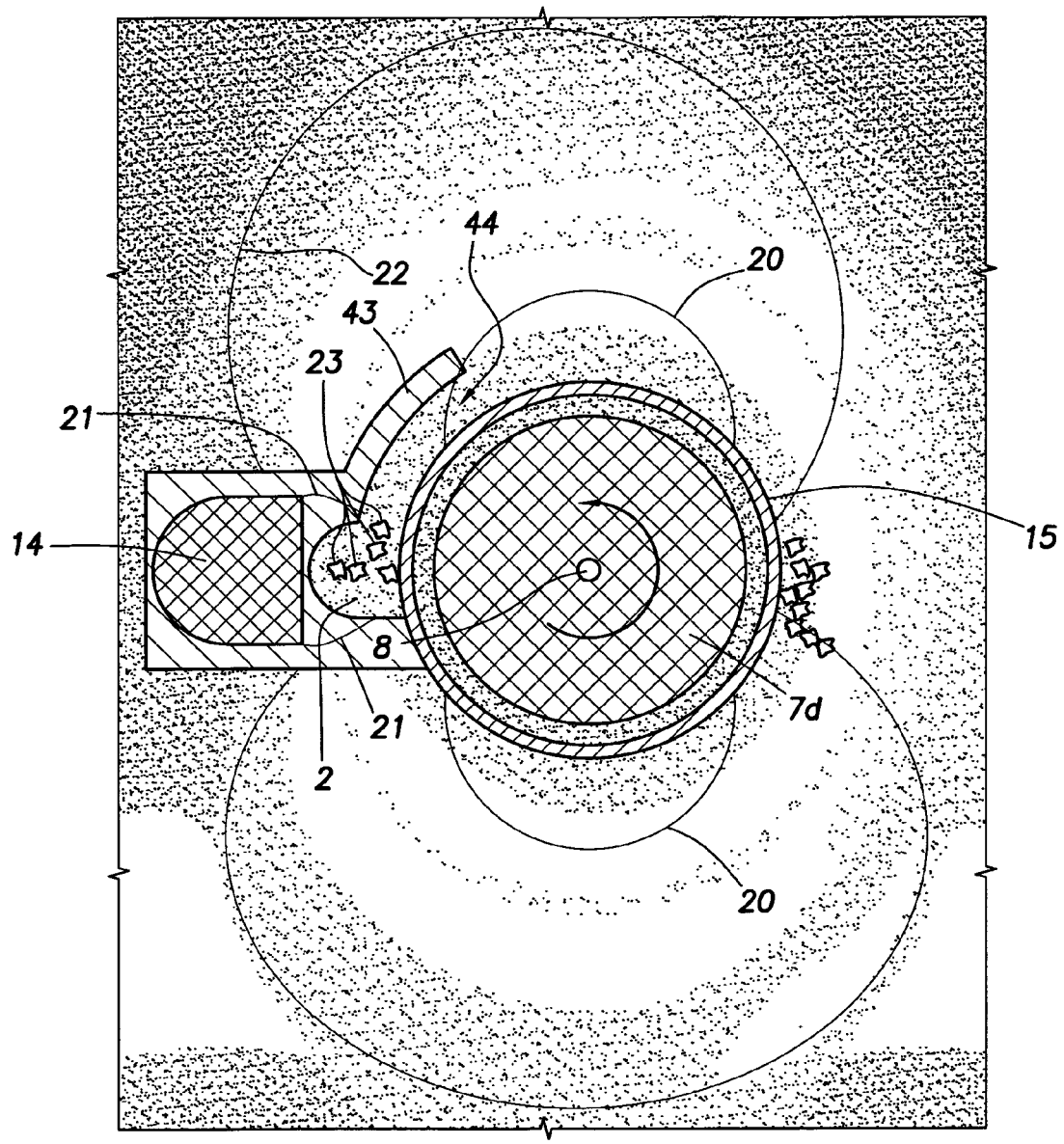
FIG. 2 shows a map of the magnetic field lines in cross section through line A-A.
Figure 5:
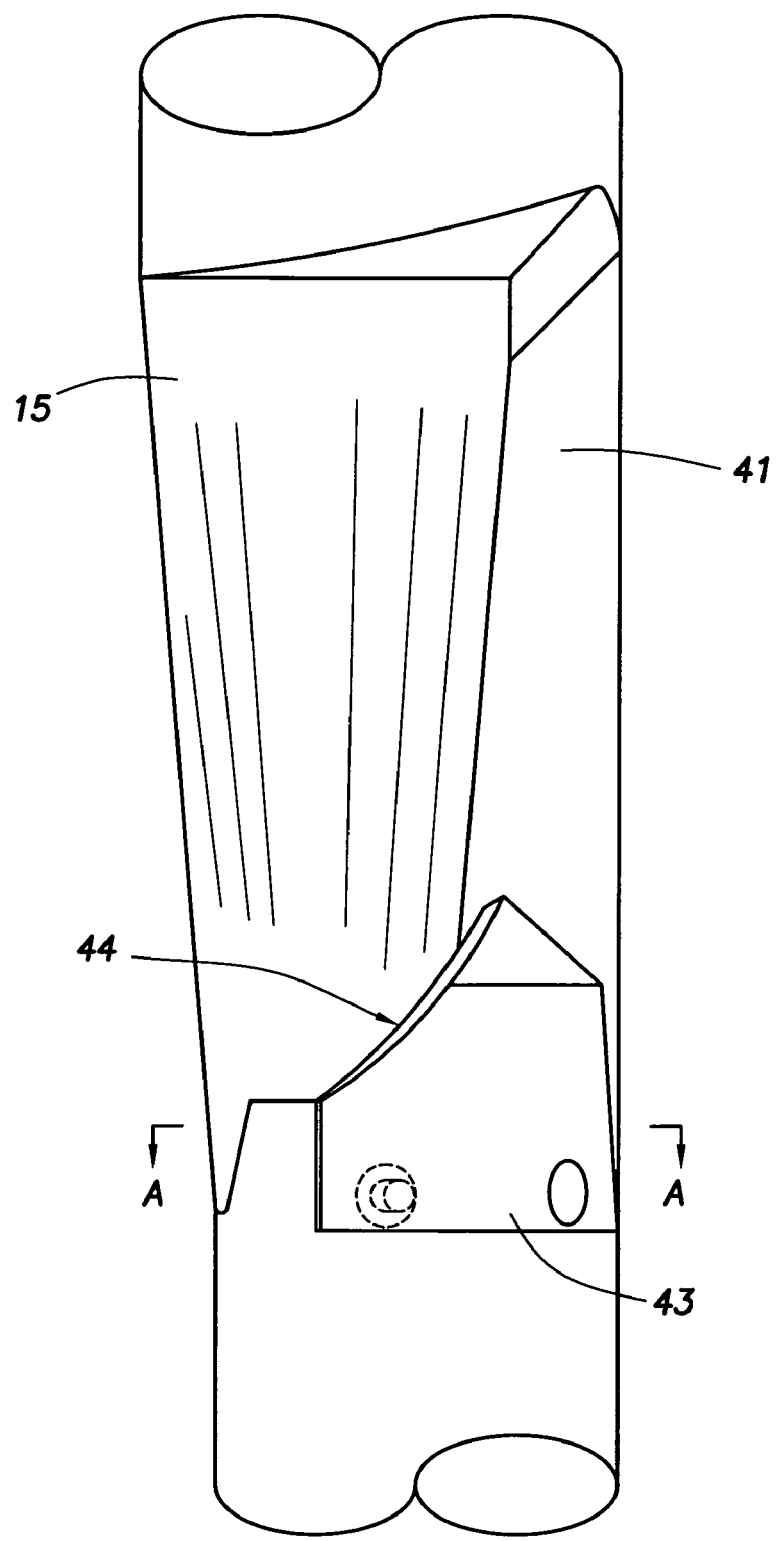
FIG. 5 shows a schematic view of a tool for excavating an object.

FIG. 2 shows a cross section along A-A as indicated in FIGS. 1 and 5, running through the magnet 7d transverse to axis 8 and through the mixing chamber 2 and the piece of magnetic material 14. The geometry is suitable for counter clockwise rotation of the separator magnet. The magnetic field strength is given for various locations around the support surface 15 by means of a grey-scale.

A portion of the magnetic field lines, for which lines 20 are an example, run between poles on magnet 7d of opposite polarity. The piece of magnetic material 14, on the side opposite from the abrasive particle inlet 4 (compare FIG. 1), causes a portion of the magnetic field lines to run from the lower end 11 of the separator magnet to this piece of magnetic material 14. Magnetic field lines 21 and 22 are an example of such bridge-forming magnetic field lines.

Also visible in FIG. 2 is a skirt 43 and a gap 44 extending between the skirt 43 and the support surface 15. This will be further explained below with reference to FIG. 5.

In operation, the tool works as follows. The tool is connected to the lower end of a drill string that is inserted from the surface into a borehole. A stream of drilling fluid is pumped by a suitable pump (not shown) at surface, via the drilling fluid channel of the drill string and the fluid passage 1 into the mixing chamber 2. During initial pumping, the stream is provided with a low concentration of abrasive particles of magnetic material such as steel shot or steel grit.

The stream flows from the mixing chamber 2 to the mixing nozzle 5 and is jetted against the borehole bottom. Simultaneously the drill string is rotated so that the borehole bottom is evenly eroded. A return stream, containing the fluid, the abrasive particles and excavation debris, flows from the borehole bottom through the borehole in a direction back to the surface. Thereby, the return stream passes along the sleeve 15.

Simultaneously with pumping of the stream of drilling fluid, the separator magnet 7 is rotated about its axis 8, in a direction dictated by the sense of the helical bands, which can be either clockwise or counter clockwise. The separator magnet 7 induces a magnetic field extending to and beyond the outer surface of the sleeve 15. As the stream passes along the sleeve 15, the abrasive particles in the stream are separated out from the, stream by the magnetic forces from the separator magnet 7 which attract the particles onto the outer surface of the sleeve 15.

The stream of drilling fluid, which is now substantially free from abrasive magnetic particles, flows further through the bore hole to the pump at surface and is re-circulated through the drill string after removal of the drill cuttings.

The magnetic forces exerted to the abrasive particles are lower in the low-field band than in the high-field band. The magnetic particles retained on the support surface 15 are attracted towards the band having the highest magnetic field. Due to rotation of the separator magnet 7 in a direction against the sense of the helical bands, the respective bands and the gradient zone in between exert a force to the magnetic particles in a direction perpendicular to the gradient zone, which has a downward component, thereby forcing the particles to follow a helically downward movement.

As the particles arrive at the second inlet 4, the stream of drilling fluid flowing into the mixing chamber 2 again entrains the particles.

As a result of the piece of magnetic material 14, the magnetic field gradient (visible as the density of grey-scale sequences) from the support surface 15 towards the inside of the mixing chamber 2 becomes less strong, such that entry of the magnetic abrasive particles 23 through inlet 4 into the mixing chamber 2 is facilitated.

Once inside the mixing chamber 2, the particles interact with the stream of drilling fluid passing through the mixing chamber 2 from inlet 3 to mixing nozzle 5, and thereby these particles will be entrained in this stream.

In a next cycle the abrasive particles are again jetted against the borehole bottom and subsequently flow through the annulus formed by the tool and the borehole, in the direction to the surface. The cycle is then repeated continuously. In this manner it is achieved the drill string/pumping equipment is substantially free from damage by the abrasive particles as these circulate through the lower part of the drill string only, while the drilling fluid circulates through the entire drill string and pumping equipment. In case a small fraction of the particles flows through the borehole to surface, such fraction can again be replaced via the stream of fluid flowing through the drill string.

The body of magnetic material can also be embodied in the form of a pellet located in a cavity provided behind the mixing chamber 2 on the side opposite from the abrasive particle inlet 4.

Figure 3:
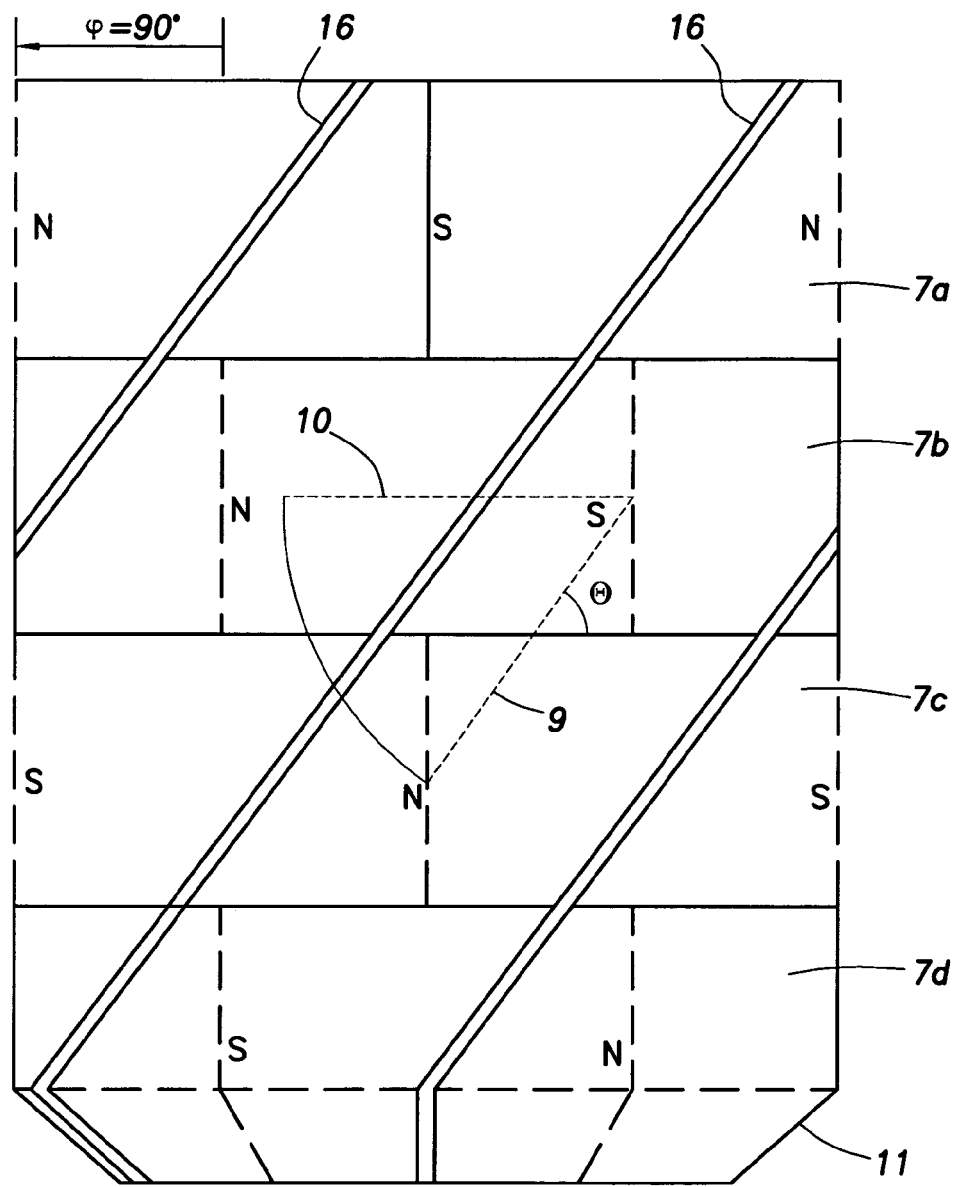
FIG. 3 schematically shows a surface map of a separator magnet surface arrangement in accordance with an embodiment of the invention.

A separator magnet 7 with a right-handed helical sense (for use in counter clockwise rotation) is shown in FIG. 3, in a representation wherein the cylindrical surface is unrolled flat in the plane of the paper. Thus vertically is set out the height of the separator magnet, which is divided in smaller magnets 7a, 7b, 7c, and 7d, and horizontally the surface at all azimuths between 0 and 360° is visible. As can be seen, the angle φ in this case is 90° in respect of every one of the smaller magnets in the stack, φ being the azimuth angle difference between the projected N-S directions in two neighbouring smaller magnets. Alternatively, the angle φ can be varied along the magnet stack.

Areas 16 schematically indicate the gradient zones, where the magnetic field strength decreases most steeply from the increased value in the high-field band to the value in the low-field band.

Depending on both φ and the axial height of the smaller magnets, each of the two high-field bands stretches in a direction making an angle θ with respect to the plane perpendicular to the central longitudinal axis as is indicated in FIG. 3. The angle θ can vary along the magnetic stack.

Magnetic particles retained on the support surface by the separator magnet tend to arrange themselves in elongate chains along a magnetic path from one pole to the nearest pole of opposite polarity. The shortest magnetic path on the approximately cylindrical surface between two adjacent N- and S-pole locations within one high-field band, indicated in FIG. 3 by dotted line 9, is shorter than the shortest path across the approximately cylindrical surface between a S-pole (or N-pole) location in that high-field band and the nearest N-pole (S-pole) location in another high-field band. Thus, the magnetic particles will tend to form a chain along line 9 in alignment with a high-field band. For reference, dotted line 10 is indicated having the same path length as dotted line 9 and it can be seen that this dotted line 10 is too short to bridge the distance from the N pole in the high-field band to the nearest S pole outside the band crossing the gradient zone 16.

The relevant distances are determined on the support surface, since that is approximately the distance over which the chains of particles would grow.

FIG. 4 shows an alternative separator magnet arrangement, also for counter clockwise rotation, whereby the magnets 7a to 7d of FIG. 1 are replaced by twice as many magnets each having half the axial height of those magnets 7a to 7d. Again, a different number of magnets may be employed. The magnets in the middle are stacked in NNSSNN or SSNNSS sequence, whereby all the adjacent poles are on a helical band. In comparison with the separator magnet 7 of FIG. 1, the neighbouring N-N and S-S pole combinations are pseudo-helically shaped in conformity with the helical arrangement of the band. Moreover, magnetic poles on the separator magnet formed by the first and last of the smaller magnets in the stack are smaller in the stacking direction than the magnetic poles in the middle portion of the separator magnet. This has the advantage that the magnetic path from the top most or the bottom most magnetic pole in the high-field band can find its nearest magnetic pole of opposite polarity in the same high-flied band. The first and last magnets in the stack may even have a smaller axial height than the other magnets in the stack.

Figure 4C:
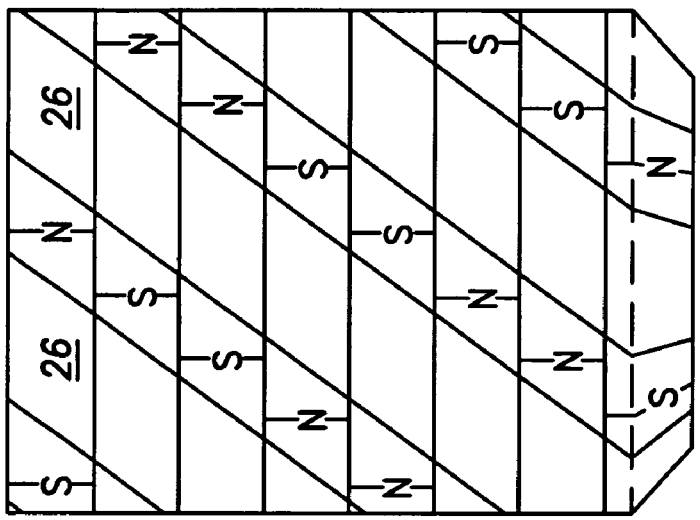
FIG. 4 (parts a to c) schematically shows various alternative separator magnet surface arrangements in accordance with an embodiment of the invention.
Figure 4A:
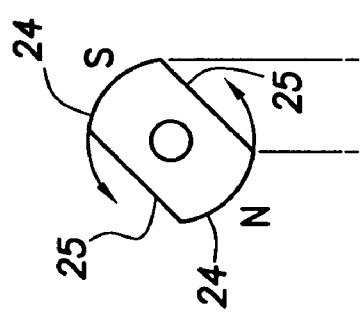

In the embodiment of FIG. 4, the region of reduced magnetic permeability is provided in the form of a helical recess 26 in the outer surface of the separator magnet 7 adjacent to the high-field band. Due to the higher magnetic permeability of the magnet material than the less magnet material that fills up the recesses (a gas, a fluid, or a solid) the internal magnetic field lines predominantly follow the material of the magnet rather than the material contained in the recess. This makes the high-field band of increased magnetic field strength, adjacent the recess 26, more pronounced. FIG. 4a shows a cross section of the separator magnet, which shows circular contours 24 around the diametrically opposing poles, connected by essentially straight contours 25. The straight contours correspond with the recess 26 and the circular contours with the high-field bands of increased magnetic field strength.

Figure 4B:
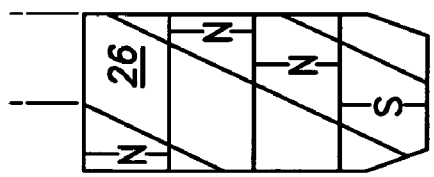

In FIG. 4b a schematic longitudinal view is provided of the separator magnet, whereby the slanted lines indicate the transition between the circular contours and the essentially straight contours. FIG. 4c provides a schematic representation of the entire surface in the same way as in FIG. 3. The angle θ of the helical recess is 53°.

Preferably, the recess reaches a depth with respect to the cylindrical circumference of the separator magnet that is similar as or greater than the distance between the gap between the magnetic surface in the high-field band and the support surface.

It will be clear that the separator magnets shown in FIGS. 3 and 4 for counter clockwise rotation can also be prepared for clockwise rotation by inverting the sense of the helical bands from right- to left-handed.

Provision of a piece of magnetic material in or close to the mixing chamber is also advantageous in recirculation tools that carry a different magnet arrangement than the preferred separator magnet arrangements described above, examples of which are provided in WO 02/34653 and in U.S. Pat. No. 6,510,907.

Suitable magnets for the described recirculation system can be made from any highly magnetisable material, including NdFeB, SmCo and AlNiCo-5, or a combination thereof.

Preferably the separator magnet also has a magnetic energy content of at least 140 kJ/m$^3$ at room temperature, preferably more than 300 kJ/m$^3$ at room temperature such as is the case with NdFeB-based magnets. A high energy content allows for shorter axial contact length of the support surface with the return stream, and consequently a stronger taper of the support surface which is advantageous for the axial transport rate. Also, less power is required for the rotation of the separator magnet.

The sleeve 15 and the drilling fluid bypass 1 are normally made of a non-magnetic material. They are suitably machined out of a single piece of the material in order to obtain optimal mechanical strength. Super alloys, including high-strength corrosion resistant non-magnetic Ni—Cr alloys, including one sold under the name Inconel 718 or Allvac 718, have been found to be particularly suitable. Other materials can be used including BeCu.

FIG. 5 shows a schematic view of a tool for excavating an object, including a recirculation system as described above. Visible are the conically shaped support surface 15 housing the separator magnet, and the ridge 41 housing the bypassing drilling fluid passage. The dimensions correspond to those given in Table I.

TABLE I

| Part name | Reference number | size |
| --- | --- | --- |
| Axial length of separator magnet | 7 | 120 mm |
| Outer diameter of separator magnet | 7 | 29 mm |
| Diameter in lower part of support surface | 15 | 34 mm |
| Diameter in upper part of support surface | 15 | 52 mm |

The region in the vicinity of the second inlet 4 (as depicted in FIG. 1) is shielded by shield in the form of a skirt 43. A gap is left open between the skirt 43 and the support surface 15, through which gap the abrasive particle inlet 4 is accessible via a path along the support surface 15. The path runs through a filter opening in the form of a slit 44 extending between the skirt 43 and support surface 15.

The support surface 15 and the inside surface of skirt 43 define a passage channel connecting the second inlet 4 with the bore hole annulus. This skirt functions as a filter to avoid rock grains larger than the size of the access window of second inlet 4 entering the passage channel.

This arrangement of the skirt 43 also guides the flow of drilling fluid from the bore hole annulus to the mixing chamber 2, along the support surface 15 in the direction of the desired transport. The recirculation of the abrasive particles back into the mixing chamber 2 is thereby further supported. In order to entrain sufficient drilling fluid with the flow of magnetic particles, the velocity of the drilling fluid in the bore hole annulus should preferably not exceed 3 m/s. Optionally, additional slots are provided in the skirt wall on the annular side.

The skirt 43 as shown in FIGS. 2 and 5 is suitable for use in combination with a counter clockwise rotatable separator magnet. It will be clear that for a tool with a clockwise rotatable separator the skirt must be provided on the other side of the abrasive particle inlet.

A jet pump mechanism in the mixing nozzle 5 generates a strong flow of drilling fluid from the mixing chamber 2 to the mixing nozzle 5. The jet pump mechanism auxiliarily supports the flow of magnetic particles into the mixing chamber 2. A larger diameter of the mixing nozzle 5 compared to a drilling fluid inlet nozzle (between inlet 3 and the mixing chamber 2) results in adequate entrainment of drilling fluid and the magnetic abrasive particles entering into the mixing chamber via abrasive particle inlet 4. The interaction between the entrained drilling fluid and the magnetic particles contributes to the efficiency of the release of particles from the support surface 15 into the mixing chamber 2 as well.

When excavating a bore hole in an earth formation, the return stream of drilling fluid in the bore hole annulus (formed by the bore hole wall and the excavating tool) may pass the recirculation system at a velocity of 2 m/s or even higher. The reach of the magnetic field into the bore hole annulus should exert a pulling force on the particles sufficiently strong to pull them to the support surface before they have passed the device. At the same time, the magnetic force pulling the particles onto the housing should be as low as possible in order to minimise friction forces and power requirements for rotating the separator magnet. The most suitable separator magnet is one that has an as high as possible coefficient for the lowest dominant radial polar moment, which is typically a magnet having a dominant dipole behaviour over a quadrupole behaviour for a certain energy content.

In order to achieve the best capture efficiency of the recirculation system, the separator magnet is preferably located in the axial centre of the bore hole. In a typical bore hole, a small axial offset of up to 15% of the diameter of the excavation tool is acceptable. The embodiment shown in FIG. 5 has an axial offset of the separator magnet contained axially inside the support surface 15 of 10%, or approximately 7 mm for a targeted 70 mm diameter bore hole.

As an alternative for the cylindrical separator magnet, the outer diameter of the separator magnet and the inner diameter of the inside wall 35 can be made to reduce with decreasing axial height. The smaller magnets from which the separator magnet is assembled can be of a frustoconical shape to obtain a tapered shape of the separator magnet. The gap between the separator magnet and the inside wall of the support sleeve may also decrease, as well as the wall thickness of the support sleeve.

The drilling fluid in the mixing nozzle 5, or in the abrasive jet, may contain a concentration of typically up to 10% by volume of magnetic abrasive particles. A typical concentration of magnetic abrasive particles that is supplied via the bypass conduit 1 lies between 0.1 and 1% by volume. The separator magnet is typically driven at a rotational frequency of between 10 and 40 Hz.

I claim:

1. A tool for excavating an object, the tool comprising:
    a jetting system arranged to impinge the object to be excavated with a jetted stream of a drilling fluid mixed with abrasive particles, the jetting system being provided with at least a mixing chamber with a drilling fluid inlet, a second inlet for abrasive particles, and an outlet nozzle for releasing the drilling fluid mixed with the abrasive particles;
    a recirculation system ranged to recirculate at least some of the abrasive particles, from a return stream of the fluid mixed with the abrasive particles downstream impingement of the jet with the object back to the jetting system, whereby the abrasive particles comprise a magnetic material, which recirculation system comprises a separator magnet for separating the abrasive particles from said return stream and for transporting the particles to the second inlet;
    a piece of magnetic material that is provided in or in the vicinity of the mixing chamber such as to draw a part of the magnetic field generated by the separator magnet into the mixing chamber.

2. The tool according to claim 1, wherein said part of the magnetic field in the mixing chamber is directed essentially transverse to a drilling fluid flow path between the drilling fluid inlet and the outlet nozzle.

3. The tool according to claim 1, wherein the piece of magnetic material is located on the side of the mixing chamber opposite from the second inlet.

4. The tool according to claims 1, wherein the recirculation system comprises a support surface to guide the abrasive particles towards the second inlet, and whereby a shield is provided at a distance from the support surface leaving a gap between the shield and the support surface thereby forming a path from the return stream to the second inlet along the support surface.

5. The tool according to claim 1, wherein the separator magnet of the recirculation system is part of a transport device for transporting the abrasive particles in a selected direction towards the second inlet, which transport device further comprises:
    a support member having a support surface for supporting the abrasive particles, the support surface extending in the selected direction, whereby the separator magnet is arranged relative to the support surface such as to generate a magnetic field for retaining the particles on the support surface whereby, the magnetic field on the support surface is arranged to have a high-field band, a low-field band, and a magnetic field gradient in a gradient zone between said high- and low-field bands whereby the magnetic field strength in the high-field band is higher than that in the low-field band;
    means for advancing the high- and low-field bands relative to the support surface in a direction having a component in the direction of the magnetic field gradient on the support surface, whereby the high-field band is followed by the low-field band.

6. The tool according to claim 5, wherein along said high-field band at least a first magnetic pole and a second magnetic pole of opposite polarity are arranged such that a first magnetic path on the support surface from the first magnetic pole to the second magnetic pole is shorter than a second magnetic path on the support surface crossing the gradient zone from the first magnetic pole to any other nearest magnetic pole of opposite polarity.

7. The tool according to claim 5, wherein the gradient zone is helically arranged around the separator magnet.

8. The tool according to claim 2, wherein the piece of magnetic material is located on the side of the mixing chamber opposite from the second inlet.

9. The tool according to claim 2, wherein the recirculation system comprises a support surface to guide the abrasive particles towards the second inlet, and whereby a shield is provided at a distance from the support surface leaving a gap between the shield and the support surface thereby forming a path from the return stream to the second inlet along the support surface.

10. The tool according to claim 2, wherein the separator magnet of the recirculation system is part of a transport device for transporting the abrasive particles in a selected direction towards the second inlet, which transport device further comprises:
    a support member having a support surface for supporting the abrasive particles, the support surface extending in the selected direction, whereby the separator magnet is arranged relative to the support surface such as to generate a magnetic field for retaining the particles on the support surface whereby, the magnetic field on the support surface is arranged to have a high field band, a low-field band, and a magnetic field gradient in a gradient zone between said high- and low-field bands whereby the magnetic field strength in the high-field band is higher than that in the low-field band;
    means for advancing the high and low-field bands relative to the support surface in a direction having a component in the direction of the magnetic field gradient on the support surface, whereby the high-field band is followed by the low-field band.

11. The tool according to claim 10, wherein along said high-field band at least a first magnetic pole and a second magnetic pole of opposite polarity are arranged such that a first magnetic path on the support surface from the first magnetic pole to the second magnetic pole is shorter than a second magnetic path on the support surface crossing the gradient zone from the first magnetic pole to any other nearest magnetic pole of opposite polarity.

12. The tool according to claim 10, wherein the gradient zone is helically arranged around the separator magnet.

13. The tool according to claim 11, wherein the gradient zone is helically arranged around the separator magnet.

14. The tool according to claim 3, wherein along said high-field band at least a first magnetic pole and a second magnetic pole of opposite polarity are arranged such that a first magnetic path on the support surface from the first magnetic pole to the second magnetic pole is shorter than a second magnetic path on the support surface crossing the gradient zone from the first magnetic pole to any other nearest magnetic pole of opposite polarity.

15. The tool according to claim 4, wherein the separator magnet of the recirculation system is part of a transport device for transporting the abrasive particles in a selected direction towards the second inlet, which transport device further comprises:
- a support member having a support surface for supporting the abrasive particles, the support surface extending in the selected direction, whereby the separator magnet is arranged relative to the support surface such as to generate a magnetic field for retaining the particles on the support surface whereby, the magnetic field on the support surface is arranged to have a high-field band, a low-field band, and a magnetic field gradient in a gradient zone between said high- and low-field bands whereby the magnetic field strength in the high-field band is higher than that in the low-field band;
- means for advancing the high- and low-field bands relative to the support surface in a direction having a component in the direction of the magnetic field gradient on the support surface, whereby the high-field band is followed by the low-field band.

16. The tool according to claim 15, wherein along said high-field band at least a first magnetic pole and a second magnetic pole of opposite polarity are arranged such that a first magnetic path on the support surface from the first magnetic pole to the second magnetic pole is shorter than a second magnetic path on the support surface crossing the gradient zone from the first magnetic pole to any other nearest magnetic pole of opposite polarity.

17. The tool according to claim 15, wherein the gradient zone is helically arranged around the separator magnet.

18. The tool according to claim 16, wherein the gradient zone is helically arranged around the separator magnet.

\* \* \* \* \*